United States Patent [19]

Girard

[11] Patent Number: 5,450,886

[45] Date of Patent: Sep. 19, 1995

[54] INFLATION VALVE AND METHOD USING SAID VALVE FOR THE INFLATION OF A TIRE WITH SEALING RING

[75] Inventor: Dominique Girard, Chateaugay, France

[73] Assignee: Compagnie Generale Des Etablissements Michelin - Michelin & Cie, Clermont-Ferrand Cedex, France

[21] Appl. No.: 243,284

[22] Filed: May 17, 1994

[30] Foreign Application Priority Data

May 26, 1993 [FR] France ............................ 93 06609

[51] Int. Cl.⁶ ............................................ B60C 29/02
[52] U.S. Cl. ..................... 152/427; 152/DIG. 11; 137/231; 137/232; 285/210; 285/178; 29/890.124; 29/464
[58] Field of Search ............... 152/427, 429, 430, 431, 152/415, 501, DIG. 11, DIG. 10, DIG. 13; 137/231, 232; 285/208, 209, 210, 178; 29/890.124, 464, 428

[56] References Cited

U.S. PATENT DOCUMENTS

| 978,504 | 12/1910 | Stewart | 285/209 |
|---|---|---|---|
| 1,822,592 | 8/1931 | Hutchinson | 152/430 |
| 2,004,082 | 6/1935 | Scherf | 137/231 |
| 2,023,267 | 12/1935 | De Saint Rapt et al. | 152/415 |
| 2,285,008 | 2/1942 | Bronson | 152/430 |
| 2,398,041 | 4/1946 | Russell | 285/208 |
| 2,742,052 | 4/1956 | McKee | 137/231 X |
| 2,744,559 | 5/1956 | Leonetti | 285/208 X |
| 2,872,963 | 2/1959 | Boyer | 285/208 X |
| 3,510,929 | 12/1970 | Kilmarx | 152/427 X |
| 3,863,697 | 2/1975 | Brown | 137/231 X |
| 4,016,918 | 4/1977 | Thacker | 152/427 |

FOREIGN PATENT DOCUMENTS 547557 5/1956 Belgium .
812373 4/1959 United Kingdom .

*Primary Examiner*—Michael W. Ball
*Assistant Examiner*—Francis J. Lorin
*Attorney, Agent, or Firm*—Brumbaugh, Graves, Donohue & Raymond

[57] ABSTRACT

In order to be able easily to inflate a tire mounted on a rim with a sealing ring (6) arranged between the two beads, without presenting the ordinary inconveniences in mounting, the inflation device is formed of a valve (V, V') provided with a locking element (2, 2') intended to be associated with a locking member (83, 51) separate from the valve. The method of inflation consists then in introducing the valve (V, V') provided with its stem (1, 1') and its locking element (2, 2') into the orifice (64) provided in the ring 6 and into the locking member (83, 51), and then turning the valve.

10 Claims, 4 Drawing Sheets

INFLATION VALVE AND METHOD USING SAID VALVE FOR THE INFLATION OF A TIRE WITH SEALING RING

BACKGROUND OF THE INVENTION

The present invention relates to a device for inflating a tubeless tire for handling vehicles, which tire is mounted on its service rim with a sealing ring arranged on the rim base between the inner walls of the two beads of said tire. It also concerns the method of inflation using such a device.

In known manner, the method of inflating of an assembly such as that described above consists in providing the sealing ring for the inflation with a cylindrical orifice into which there is inserted a tube provided at its radially outer end with a thread serving for the screwing on of a nut after the putting a sealing washer in place, and at its radially inner end with a second thread onto which a so-called "single bend" valve or a rigid or flexible bent extension is screwed, after putting a second sealing washer in place.

Such an inflation device has numerous drawbacks and, more particularly, it gives rise to difficulties in mounting the sealing ring on the service rim and difficulties in putting the valve branch in place. Due to the position of the end of the threaded tube, the radially inner face of the sealing ring has an excess thickness, and as a normally thick sealing ring is scarcely extensible, its passage on the rim in order to reach the passage opening for the valve is very inconvenient.

Furthermore, the threaded tube and the sealing ring being correctly positioned, the screwing of the "single bend" valve branch or of a bent valve extension is not an easy operation due to the presence of the wheel disk present in the vicinity of the opening in the rim, and it is necessary to effect several turns of the valve branch in order to lock it by screwing.

SUMMARY OF THE INVENTION

In order to overcome the above drawbacks, the invention proposes a device for the inflation of a tubeless tire, mounted on a flat base rim, having several parts and a valve passage opening, which has a sealing ring arranged around the rim between the inner walls of the beads of the tire, said ring being provided with at least one cylindrical orifice of diameter $\phi$ which passes completely through its thickness, the said device being formed at least of an inflation valve and a valve attachment means, characterized by the fact that said valve is formed of a rectilinear stem of diameter $\phi 1$ which is between 1.2 and 2.0 $\phi$, provided at a distance $\lambda$ from its end which is at least equal to the length of the orifice of the ring, with a male locking element intended to cooperate with a female locking element separate from the valve, the stem of said valve being extended on the other side of the locking element by a bent stem which is threaded at its end in order to receive the valve cap.

The female locking member or element forms with the valve proper, provided with a male locking element, the inflation device for the tire. The locking member may be either an element of the rim or an element of the sealing ring included in said ring or forming an assembly with said ring.

In the case of the rim element, the female locking member is the opening in the rim intended for the passage of the valve and the locking means of the valve is then a plate having four sides, two of said sides being parallel and rectilinear, spaced apart by a distance, measured perpendicular to said sides, which is less than the width of the valve opening in the rim, and having a length greater than the width of said opening, the other two sides being straight or curved. This plate is either integral with the valve stem or is free for rotation around said stem.

In the case of a female locking element for the sealing ring, said element may be a metal washer having a central circular orifice with two diametrically opposite notches. These notches are intended for the passage of two locking spurs placed on the valve stem, these spurs being the male locking elements.

The metal washer is preferably arranged between two backing reinforcements of textile threads or cords, these reinforcements being calendared by a rubber compound, in the advantageous case in which the washer is integrated with the sealing ring, during the manufacture of said ring.

In further advantageous manner, the metal washer can be housed in a cavity in the ring, the use of the washer having the advantage of uniformity of the radially inner face of the sealing ring.

In accordance with the invention, the method of inflation employing the means defined above consists, after the mounting of the tire on the rim and of the sealing ring, taking care to have the inflation orifice of the ring coincide with the valve passage opening in the rim, in manually inserting the lubricated valve stem into the orifice of the ring in such a position that the valve locking means can penetrate through the locking members on the outside of the valve, resting against the radially inner face of the sealing ring, and turning the locking element of the valve by an angle $\alpha$, $\alpha$ being preferably equal to 90°.

DESCRIPTION OF THE DRAWINGS

The characteristics and advantages of the invention will be better understood by means of the following description read with reference to the drawing which illustrates, in non-limitative manner, embodiments of the invention, and in which.

DESCRIPTION OF PREFERRED EMBODIMENTS

Figures 1, 2:
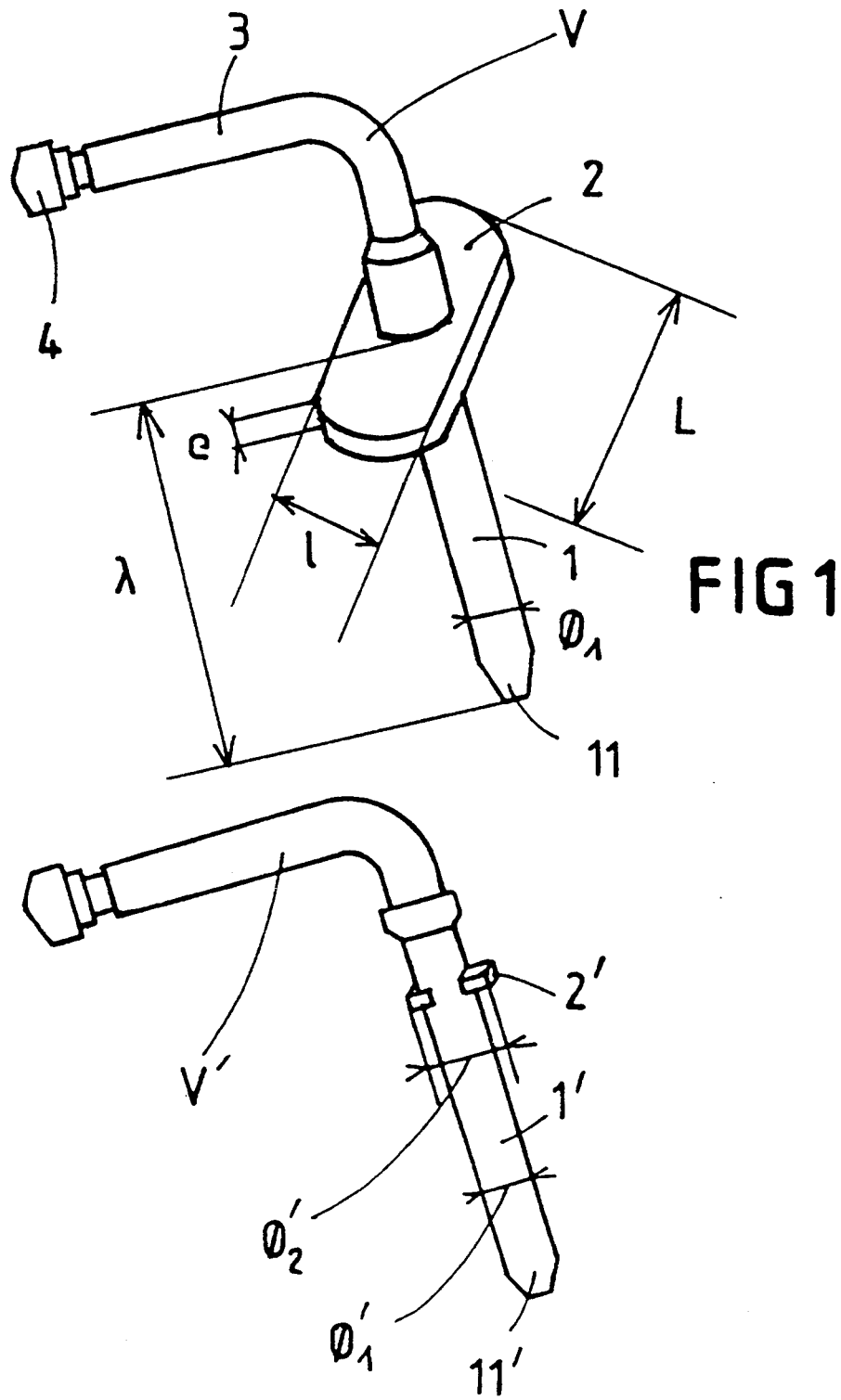
FIG. 1 diagrammatically shows a first variant of the valve in accordance with the invention.
FIG. 2 diagrammatically shows a second variant of the valve.

The valve V of FIG. 1, which is a bent valve, comprises primarily a stem 1 of a diameter $\phi 1$ equal to 6 mm and a length $\lambda$ equal to 30 mm, and a threaded arm 3 on which there is screwed the valve cap 4. The stem 1 has a frustoconical end 11. Rigidly attached to the stem 1, there is the male locking element of the valve in the form of a metal plate 2 of a thickness e equal to 2 mm and having two parallel straight sides of a length L equal to 27 mm and two curved sides of width $1 = 14$ mm which is slightly less than the width of the opening 83 (FIG. 5) provided in a rim set 80 onto which the sealing ring 6 made of rubber or other elastic material is applied.

The valve V', shown in FIG. 2, differs from that shown in FIG. 1 primarily by the locking means, which in this case consists of two spurs 2' the ends of which are spaced apart by the amount $\phi'_2$ equal to 9 mm, while the diameter $\phi'_1$ of the cylindrical stem 1 is equal to 5 mm. The stem 1' has a frustoconical end 11' as in the case of FIG. 1.

Figure 3A:
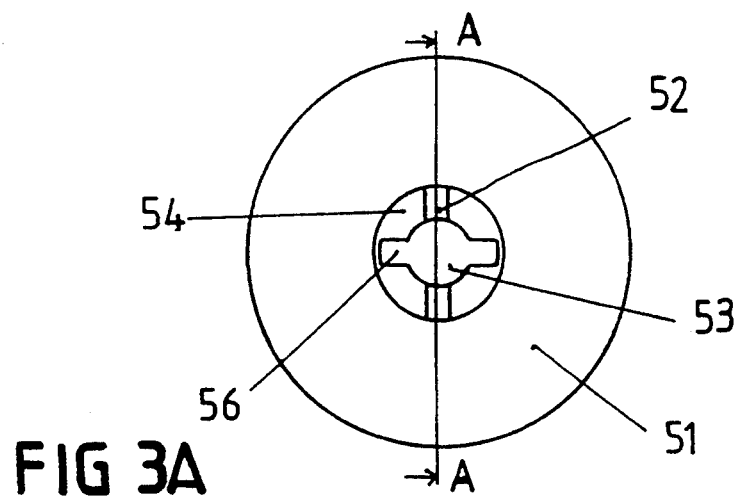
FIG. 3A is a top view of the female locking member intended for use with the element of the valve of FIG. 2.
Figure 3B:
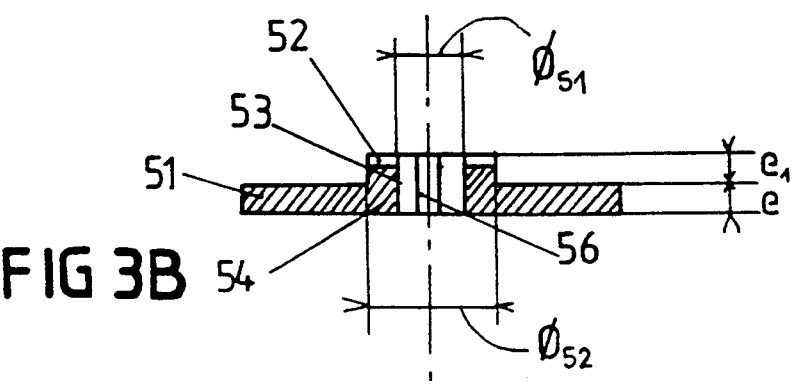
FIG. 3B is a view along the line AA of FIG. 3A.

The metal washer 51, shown in FIGS. 3A and 3B, is the locking member separate from the valve, intended to receive the spurs 2 of the valve of FIG. 2. This washer 51 is in the form of a hollow cylinder of very slight height or thickness e of 2 mm, the inner hollow 53 of which has a diameter $\phi 51$ equal to 6 mm bordered by a circular shoulder 54 of thickness $e_1$ substantially equal to 2 mm; the outside diameter $\phi 52$ of the shoulder is equal to 11 mm. This circular shoulder 54 is discontinuous as a result of the fact that it is provided with two diametrically opposite notches 56, these notches permitting the spurs 2' of the valve to pass through the metal washer 51.

Figure 3C:
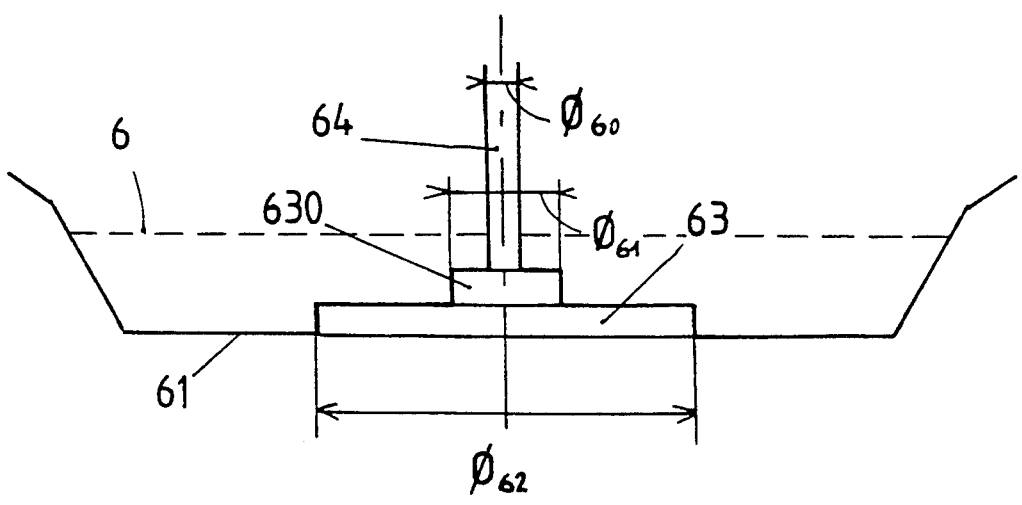
FIG. 3C is an elevational view of a sealing ring intended to receive the element of FIGS. 3A and 3B.

As to the sealing ring 6 shown in FIG. 3C, which is intended to receive the metal washer 51, it has, on its radially inner face 61, a first circular cavity 63 the diameter $\phi 62$ of which is equal to the diameter of the washer 51 and a second circular cavity 630 the diameter $\phi 61$ of which is slightly less than the diameter $\phi 52$, the depth of this second cavity corresponding to the projection of the shoulder 54 above the surface of the washer. In the middle of this cavity 630 there commences the orifice 64 for receiving the valve stem, the diameter $\phi 60$ of which orifice is equal to 3 mm, that is to say less than the diameter $\phi_1$ of the stem 1' of the valve V'.

Figure 4:
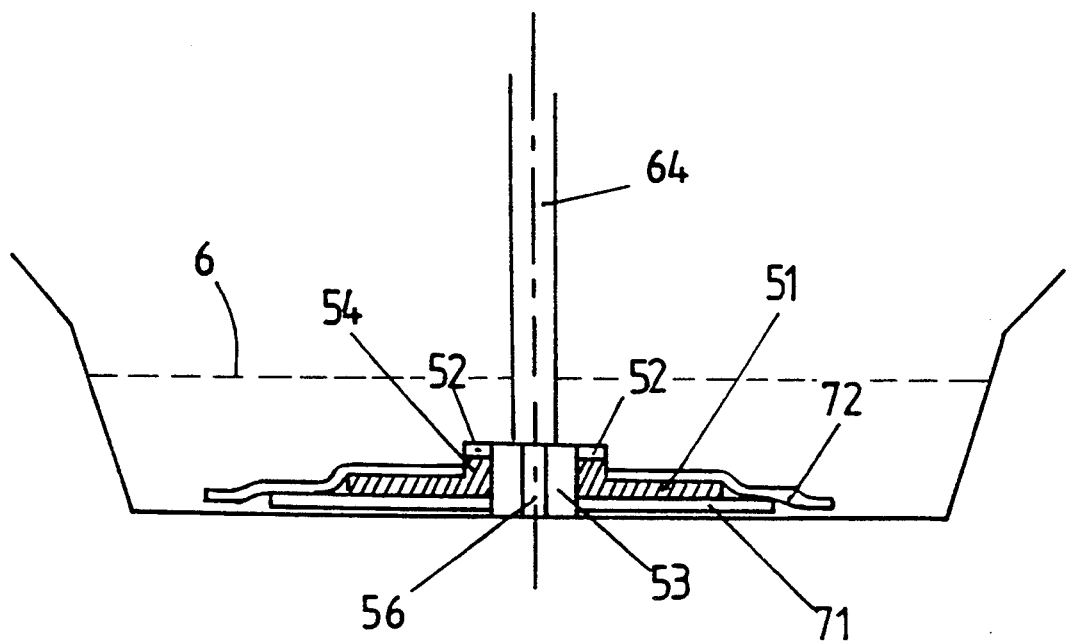
FIG. 4 diagrammatically shows a sealing ring in which the locking element is integrated.

FIG. 4 shows a sealing ring 6 in which the metal washer 51, as shown in FIGS. 3A and 3B, is integrated in the manufacture of the ring 6. The spurs 2' of the valve V' penetrate into the notches 56 provided for this purpose and after rotation of the valve by 90°, these spurs assume a position in the recesses 52.

In order to reinforce the parts of the ring 6 adjacent the washer 6 there are two backing reinforcements 71, 72 formed of rubberized textile cords, one reinforcement 71 being arranged radially below the washer 51 and the second reinforcement 72 being arranged radially above it. These two reinforcements are in the form of circular rings of slight thickness.

The manner of inflation using a valve V' in accordance with FIG. 2 and a metal washer 51 applied against the radially inner face of the sealing ring 6, and more particularly housed in the cavity(ies) 63, 630 provided for this purpose on the radially inner face 61 comprises the following simple steps:

lubrication of the valve stem 1';
 application of the metal washer 51 in the cavities 63, 630;
 penetration by force of the valve stem in the orifice 64 of the ring 6, the locking spurs 2' of the valve V' passing through the notches 56 provided for this purpose in the washer 51;
 turning of the valve stem 1' by an angle $\alpha$ in the orifice 64, $\alpha$ being equal to 90° so that the spurs 2' come into position in the two recesses 52 provided for this purpose in the circular shoulder 54 of the washer 51;
 inflation of the unit by the valve V'.

While the method described above employs a separable washer 51 which is separate from the sealing ring 6, an equivalent method employs a ring 6 the base of which is provided axially in its central part with a metal washer 51 which is an integral part of the ring 6, with or without the reinforcements 71, 72 described above.

Figure 5A:
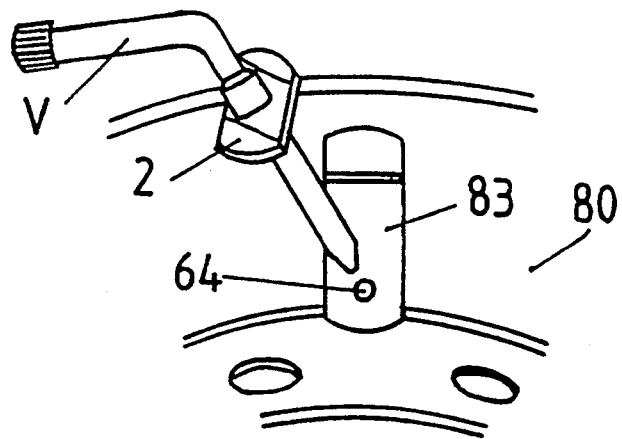
FIGS. 5A to 5C show the steps of the method of inflation in accordance with the invention, FIG. 5A showing the putting in place of the valve, FIG. 5B showing the locking of the valve, and FIG. 5C showing the assembly mounted and inflated.
Figure 5B:
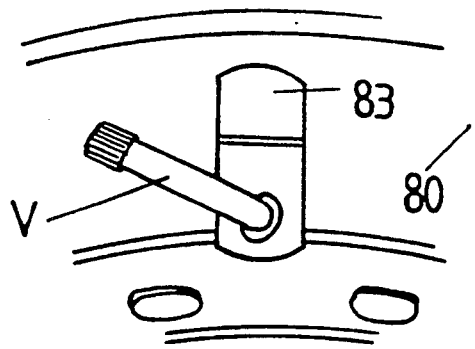
Figure 5C:
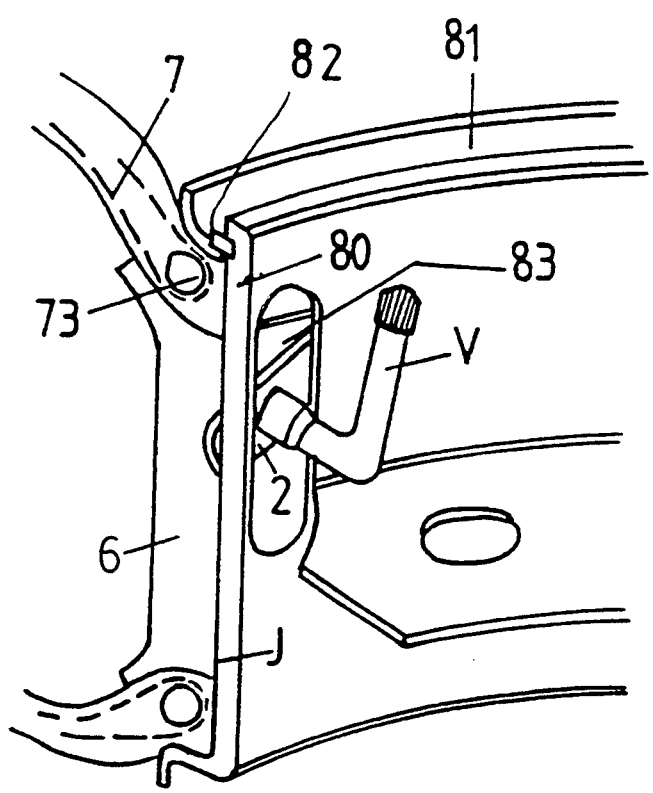

The procedure, employing a valve V the stem 1 of which is provided with a metal plate 2 as locking means, is shown diagrammatically in FIGS. 5A to 5C. In FIG. 5A, the valve V of FIG. 1 is positioned facing the orifice 64 of the sealing ring 6 which orifice can be seen through the valve passage opening 83 present in the rim base 40 of the mounting rim J.

The valve is presented facing the opening 83 in such a manner that the metal plate 2 has its two parallel straight sides of length L parallel to the straight edges of the opening 83, as shown in FIG. 5A.

The lubricated stem 1 is then pushed into the orifice 64 and an additional pressure is then exerted on the valve and on the sealing ring 6 in order to be able to effect a rotation by an angle 6 equal to 90° of the stem 1 and of the plate 2 rigidly attached to the stem, so that locking takes place as shown in FIG. 5C, this rotation. taking place without the wheel disk interfering in any way with this maneuver. It is then sufficient to inflate the tire with carcass reinforcement 7 anchored in each bead to a bead wire 73 so that the sealing ring 6 exerts sufficient pressure on the plate 2 to hold it in place and avoid leaks, the beads of the tire then being applied against the rim shoulders 81, one of them being held in place on the rim J by means of a locking ring 82.

In the case of a plate which is free in rotation around said stem, the rotation is effected by a means not part of the valve V, which means may be a simple metal rod.

I claim:

1. A device for inflating a tire mounted on an assembly which includes a rim with a flat base between rim shoulders and provided with an opening for the passage of a valve and a sealing ring arranged between the inner walls of the beads of the tire, said ring being provided with a cylindrical orifice of diameter $\phi$, the said device comprising at least one inflation valve having a straight stem of diameter between 1.2 and 2.0 $\phi$ for insertion into said ring orifice and provided, at a distance from its end at least equal to the length of the cylindrical orifice of the sealing ring, with a male locking element and said device further comprising a female locking element separate from the valve and forming part of said assembly, the male and female locking elements being located radially inwardly of the portion of the orifice which receives the stem and interlocking to hold the valve, the stem of said valve being extended on the other side of the male locking element by a threaded bent stem.

2. A device according to claim 1, wherein the male locking element of the valve is a metal plate having at least two sides which are straight and parallel and spaced apart by a distance less than the width of the valve passage opening and the length of which is greater than the width of said passage opening, and the female locking element separate from the valve is the passage opening in the rim for the valve.

3. A device according to claim 1, wherein the locking element of the valve is formed of two spurs and the female locking element separate from the valve is a metal washer having a central circular orifice provided with two diametrically opposite notches.

4. A device according to claim 3, characterized by the fact that the metal washer is housed in a cavity provided for this purpose on the radially inner face of the sealing ring.

5. A device according to claim 3, characterized by the fact that the metal washer is an integral part of the sealing ring.

6. A device according to claim 5, characterized by the fact that the metal washer is interposed radially on the inside and outside between two backing reinforcements in the form of circular rings and formed of textile cords.

7. A method of inflating a tire mounted on a rim with flat base between rim shoulders and provided with a valve passage opening with a sealing ring arranged between the inner walls of the beads of the tire, said ring being provided with a cylindrical orifice of diameter $\phi$, comprising mounting the tire and sealing ring on the rim with the orifice of the ring aligned with the valve passage opening of the rim, inserting a lubricated stem of the valve through the valve passage opening of the rim and in the orifice of the ring in a position such that a locking element of the valve penetrates through a locking element separate from the valve and which separate locking element is pressed against the radially inner face of the sealing ring and rotating the locking element of the valve through a part of a revolution to interlock the locking elements.

8. A device for inflating a tire having beads comprising a tire mounting assembly which includes a rim and a sealing ring on the rim interposed between the tire beads, the rim and sealing ring having aligned openings communicating with the interior cavity of the tire, the opening through the sealing ring being expandable, an inflation valve including a stem insertable through said aligned openings and tightly fitting into the opening of the sealing ring so as to expand the opening, a male locking element carried by the stem having an outwardly extending protrusion on the stem and a bent portion of the stem opposite the end of the stem which is inserted into the opening in the sealing ring, and a female locking element forming part of said tire mounting assembly, which male and female elements being located radially inwardly of the portion of the orifice which receives the stem and interlock when the valve stem is rotated after insertion into said aligned openings.

9. A device as set forth in claim 8, in which the diameter of the stem is in the range of 1.2 to 2.0 times the diameter of the opening in the sealing ring.

10. A device as set forth in claim 8, in which the distance between the end the stem inserted into the opening and the male locking element carried by the stem is at least equal to the length of the opening in the sealing ring.

* * * * *

UNITED STATES PATENT AND TRADEMARK OFFICE
CERTIFICATE OF CORRECTION

PATENT NO. : 5,450,886
DATED : Sept. 19, 1995
INVENTOR(S) : Girard

It is certified that error appears in the above-indentified patent and that said Letters Patent is hereby corrected as shown below:

Title page, Item 56, 4th line, "8/1931" should read —9/1931—.

Title page, 2nd col., 1st line, "2/1942" should read —6/1942—.

Title page, 2nd col., 6th line, "12/1970" should read —5/1970—.

Col. 1, line 18, "putting" should read —putting of—.

Col. 4, line 25, "angle 6" should read —angle α—.

Col. 6, line 25, "end" should read —end of—.

Signed and Sealed this

Twenty-seventh Day of February, 1996

Attest:

BRUCE LEHMAN

*Attesting Officer*  *Commissioner of Patents and Trademarks*